United States Patent
Xue et al.

(10) Patent No.: US 11,360,766 B2
(45) Date of Patent: Jun. 14, 2022

(54) SYSTEM AND METHOD FOR PROCESSING LARGE DATASETS

(71) Applicant: Alibaba Group Holding Limited, Grand Cayman (KY)

(72) Inventors: Fei Xue, Sunnyvale (CA); Shuangchen Li, Sunnyvale, CA (US); Feng Zhu, Sunnyvale, CA (US); Hongzhong Zheng, Los Gatos, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/087,203

(22) Filed: Nov. 2, 2020

(65) Prior Publication Data

US 2022/0137960 A1    May 5, 2022

(51) Int. Cl.
  *G06F 9/30* (2018.01)
  *G06F 9/38* (2018.01)
  *G06F 3/06* (2006.01)
  *G06F 13/16* (2006.01)

(52) U.S. Cl.
  CPC .......... *G06F 9/3001* (2013.01); *G06F 3/0604* (2013.01); *G06F 3/0659* (2013.01); *G06F 3/0679* (2013.01); *G06F 9/3814* (2013.01); *G06F 13/1668* (2013.01)

(58) Field of Classification Search
  CPC .. G06F 3/0679; G06F 13/1668; G06F 9/3001; G06F 9/3814
  See application file for complete search history.

(56) References Cited

U.S. PATENT DOCUMENTS

| | | | |
|---|---|---|---|
| 9,003,109 B1* | 4/2015 | Lam | G06F 13/28 711/103 |
| 2020/0081658 A1* | 3/2020 | Choi | G06F 12/0246 |
| 2021/0255861 A1* | 8/2021 | Ramesh | G06F 9/30036 |

* cited by examiner

*Primary Examiner* — Zachary K Huson

(57) ABSTRACT

An apparatus comprises a bulk array of non-volatile memory cells on an integrated circuit die and an arithmetic logic unit on the die coupled to the bulk array. The arithmetic logic unit is operable to perform arithmetic logic operations on contents of the bulk array responsive to instructions received from outside of the die. The non-volatile memory cells may include NAND-type flash memory cells.

20 Claims, 5 Drawing Sheets

300

| 310 Base opcode (read/write/erase) | 320 Address (plane/page/offet) | 330 Prefetch address | 340 Dataset opcode (add/sub/mult/compare) | 350 If accumulate |

Fig. 3

SYSTEM AND METHOD FOR PROCESSING LARGE DATASETS

FIELD OF INVENTION

Embodiments of the present invention relate to the field of data processing. More specifically, embodiments of the present invention relate to systems and methods for processing large datasets.

BACKGROUND

Numerous recent and evolving areas of both research and commercial applications rely on very large datasets, e.g., graphs. Example applications include computational fluid dynamics, computational biophysics, image processing, genome analysis, E-commerce, search engines, machine learning, and neural networks, including graph neural networks (GNN). Such large datasets may exceed ten terabytes and greater in size.

Processing of such datasets is conventionally performed by loading the dataset into dynamic random access memory (DRAM) configured as processor main memory, spread across a distributed computer system. For example, since DRAM is volatile, a dataset must first be moved from permanent storage, e.g., hard disk drives, into DRAM. This can be a deleteriously time-consuming operation. After the dataset is loaded into main memory, portions of the dataset must be read from DRAM to a processor, processed by the processor, and written back to DRAM. Unfortunately, DRAM access times, including, for example, computer data bus bandwidth limitations, are undesirably slow. For example, main memory (DRAM) access may be slower, by an order of magnitude or more, than a processor is able to perform operations. This may lead to undesirable and/or unacceptable performance levels. In addition, the cost of such large amounts of DRAM, e.g., terabytes in size, coupled with the computer systems needed to support such large amounts of DRAM, is often considered commercially infeasible, limiting the use of such very large datasets.

SUMMARY OF THE INVENTION

Therefore, what is needed are systems and methods for processing large datasets. What is additionally needed are systems and methods for processing large datasets that can overcome the bandwidth limitations of transferring a large dataset back and forth from main memory to a processor. There is a further need for systems and methods for processing large datasets that are compatible and complementary with existing systems and methods of processing large datasets, e.g., graph processing.

In accordance with an embodiment of the present invention, an apparatus comprises a bulk array of non-volatile memory cells on an integrated circuit die and an arithmetic logic unit on the die coupled to the bulk array. The arithmetic logic unit is operable to perform arithmetic logic operations on contents of the bulk array responsive to instructions received from outside of the die. The non-volatile memory cells may include NAND-type flash memory cells.

In accordance with another embodiment of the present invention, a drive controller includes an interface configured to functionally couple the drive controller to a plurality of memory integrated circuit devices, a bus interface configured to functionally couple the drive controller to a computer system, and a dataset controller operable to perform dataset operations on a dataset stored within the plurality of memory integrated circuit devices without transferring contents of the dataset over the bus interface.

In accordance with a further embodiment of the present invention, a solid state drive unit includes a plurality of non-volatile memory integrated circuit dice of chips. Each of the memory integrated circuit die includes a bulk array of non-volatile memory cells on an integrated circuit die, and an arithmetic logic unit on the die, coupled to the bulk array. The arithmetic logic unit is operable to perform arithmetic logic operations on contents of the bulk array responsive to instructions received from outside of the die. The solid state drive unit also includes a bus interface configured to functionally couple the drive unit to a computer system and a dataset controller operable to perform dataset operations on a dataset stored within the plurality of non-volatile memory integrated circuit dice without transferring contents of the dataset over the bus interface.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings may not be drawn to scale.

FIG. 3 illustrates an exemplary instruction that is sent to a memory integrated circuit, in accordance with embodiments of the present invention.

DETAILED DESCRIPTION

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

System and Method for Processing Large Datasets

Embodiments in accordance with the present invention are described herein in terms of a solid state drive (SSD) based on negative AND gate (NAND) type of flash memory, functionally attached to a computer system via a Peripheral Component Interconnect Express (PCIe) computer expansion bus. This description is exemplary and is not limiting. It is to be appreciated that embodiments in accordance with the present invention are well suited to a wide variety of memory cell technologies, including, for example, bubble memory, NOR-type flash memory, resistive random-access memory (ReRAM), conductive bridging RAM (CBRAM), Ferroelectric RAM (FeRAM), Magnetoresistive RAM (MIRAI), ferroelectric field-effect transistor (FeFET) memory, domain-wall memory (DWM), carbon nanotube memory (NRAMI), Millipede memory, Electrochemical Random-Access Memory (ECRAM), and the like.

Similarly, embodiments in accordance with the present invention are well suited to a wide variety of functional connections to a computer system, including, for example, computer expansion busses, e.g., industry standard architecture (ISA), extended ISA (EISA), MicroChannel, Multibus, IEEE 796, IEEE 1196, IEEE 1496, PCI, Computer Automated Measurement and Control (CAMAC), MBus, Runway bus, Compute Express Link (CXL), and the like. In addition, embodiments in accordance with the present invention are well suited to a wide variety of peripheral connection busses, e.g., universal serial bus (USB), Advanced Technology Attachment (ATA), Serial ATA (SATA), IEEE 1394, Small Computer System Interface (SCSI), and the like.

Figure 1:
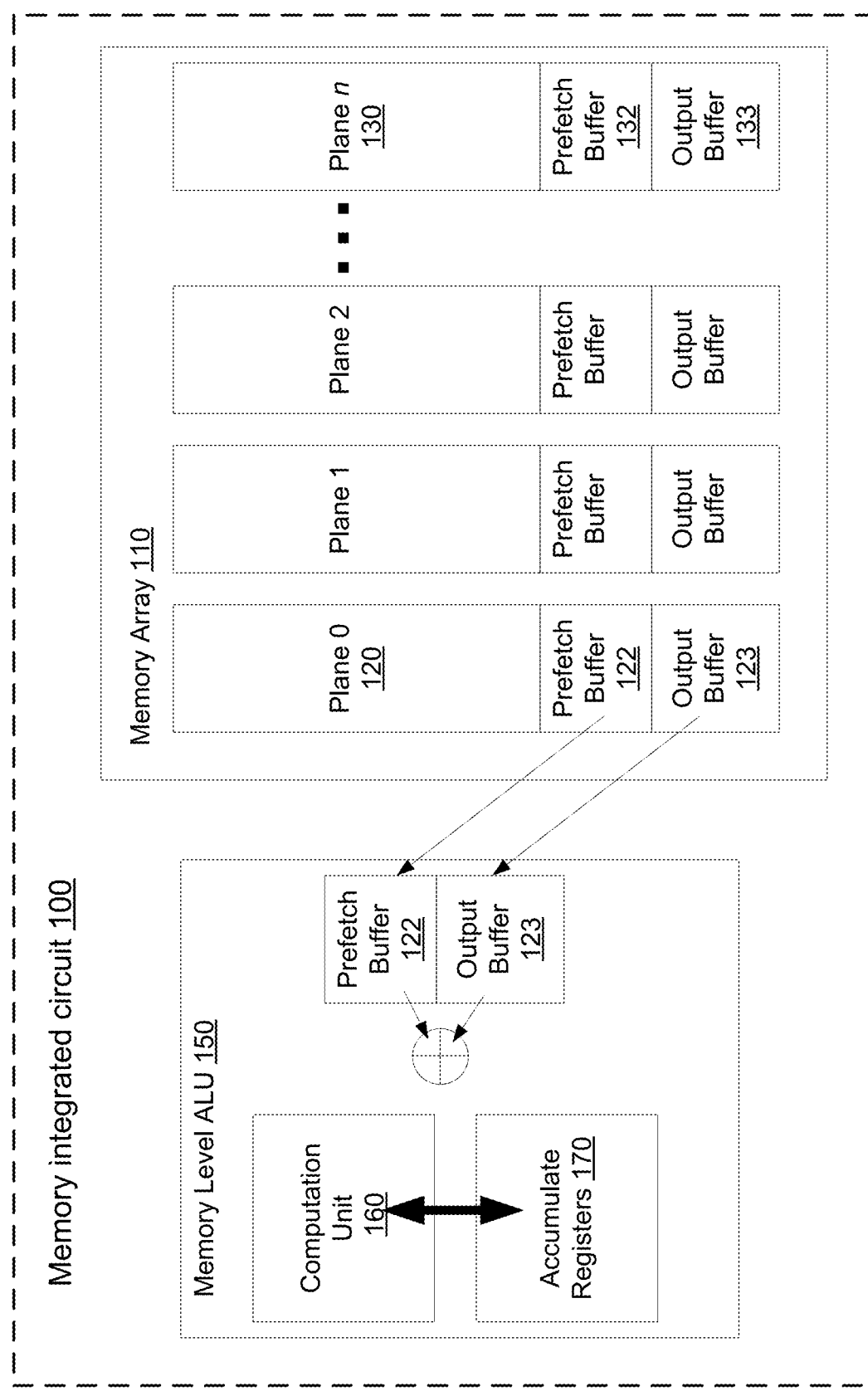
FIG. 1 illustrates an exemplary block diagram of a memory integrated circuit, in accordance with embodiments of the present invention.

FIG. 1 illustrates an exemplary block diagram of a novel memory integrated circuit 100, in accordance with embodiments of the present invention. Although memory integrated circuit 100 is illustrated as a NAND-type flash memory, this is exemplary, and embodiments in accordance with the present invention are not limited to this memory technology. In addition, any size notations, e.g., array size and/or bus width, are exemplary, and not limiting.

Memory integrated circuit 100 comprises a bulk array of memory cells 110, e.g., NAND memory cells. Those skilled in the art will appreciate the differences between bulk arrays and other types of memory, for example, cache memory or register memory. Memory cell array 110 comprises a plurality, e.g., n+1, of planes, labeled plane 0 120 through plane n 130. Each plane may comprise four (4) kilobytes of memory, for example. Memory arrays are frequently organized into blocks comprising a plurality of memory cells, organized as a plurality of word lines comprising a plurality of bit lines. A plane comprises a plurality of such blocks. Each plane has an associated prefetch buffer, e.g., prefetch buffer 122 of plane 0 120, and an associated output buffer, e.g., output buffer 123 of plane 0 120, in some embodiments.

Memory integrated circuit 100 also comprises a novel memory level arithmetic logic unit (ALU) 150. Memory level arithmetic logic unit 150 is associated with memory cell array 110. In some embodiments, memory level ALU 150 may be located on the same integrated circuit die as memory cell array 110. Memory level ALU 150 is configured to perform logical and/or mathematical operations on the contents of a prefetch buffer and an output buffer of a plane of memory cell array 110. For example, as illustrated, memory level ALU 150 may perform operations on prefetch buffer 122 of plane 0 120 and output buffer 123 of plane 0 120. Memory integrated circuit 100 may comprise logic (not shown) to selectively route a prefetch buffer and an output buffer from any plane of memory cell array 110 to memory level ALU 150. In some embodiments, memory level ALU 150 may utilize the buffers of a memory plane, e.g., prefetch buffer 122 of plane 0 120 and output buffer 123 of plane 0 120. In other embodiments, the buffer contents may be duplicated in additional registers dedicated to memory level ALU 150.

Memory level arithmetic logic unit 150 may generally perform a set of operations to facilitate processing of a given dataset. Any suitable operations may be implemented, in accordance with embodiments of the present invention. Typical operations may include, for example, add, subtract, multiply, divide, compare, shift, rotate, two's complement, multiply-accumulate (MAC), AND, OR, XOR, and the like. Memory level ALU 150 may comprise, for example, combinational logic, finite state machine(s), and/or stored program processing unit(s), in any combination, and may further include microcode. Memory level ALU 150 is configured to receive an opcode to perform a desired operation on its inputs from the available operations, and store the result in accumulate registers 170.

Figure 2:
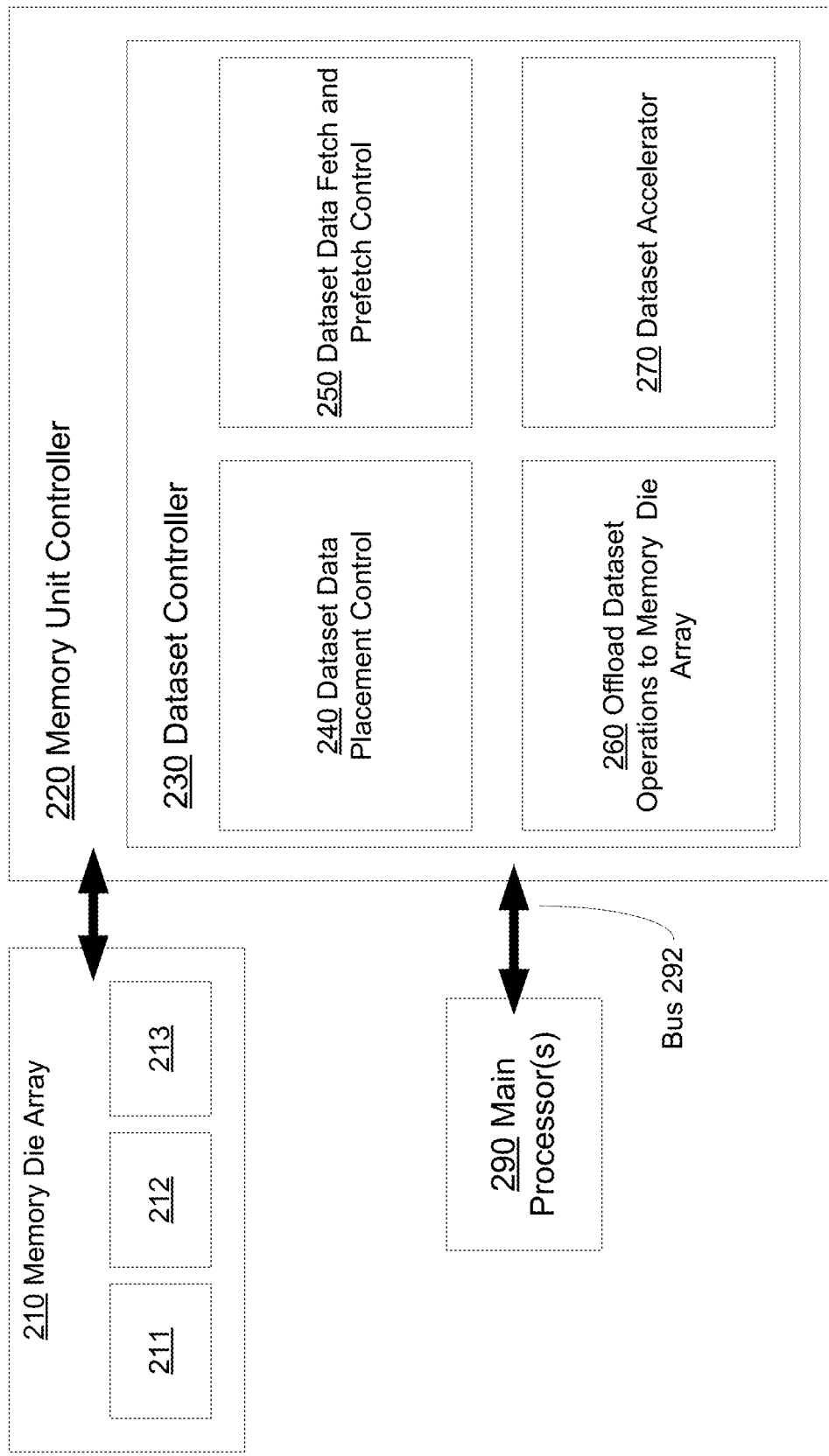
FIG. 2 illustrates an exemplary block diagram of a novel drive unit for processing large datasets, in accordance with embodiments of the present invention.

FIG. 2 illustrates an exemplary block diagram of a novel drive unit 200 for processing large datasets, in accordance with embodiments of the present invention. Drive unit 200 may be characterized as a solid state drive (SSD) in some embodiments. Drive unit 200 comprises a plurality 210 of memory integrated circuits 211, 212, 213. There will typically be many more dice than the three illustrated. Memory integrated circuits 211, 212, 213 may comprise memory integrated circuit 100 of FIG. 1, for example. In accordance with embodiments of the present invention, each such die of the plurality of integrated circuits 210 comprises a memory level ALU, e.g., memory level ALU 150 of FIG. 1.

Drive unit 200 comprises a memory unit controller 220. As is known, storage devices, e.g., memory integrated circuits, of a drive unit, e.g., a solid state drive, generally cannot interface directly with a computer bus and/or processor, e.g., processor(s) 290. Memory unit controller 220 provides a range of functions to enable a drive unit to functionally interact with a processor via a bus 292, including, for example, bus interface control, logical to physical address translation, read, memory cell programming (write), memory cell erasing, wear leveling, defect management, and the like.

In accordance with embodiments of the present invention, memory unit controller 220 comprises additional functionality, beyond what is conventionally needed to implement a storage functional unit. Memory unit controller 220 comprises a novel dataset controller 230. The dataset controller may share hardware with the memory unit controller 220, in some embodiments. Dataset controller 230 controls and distributes dataset operations among itself and to the memory level ALUs, e.g., memory level ALU 150 (FIG. 1), of memory dies 100 of memory die array 210. For example, operations on a single dataset node, or operations between two dataset nodes that are stored on the same memory die, may be performed by a memory level ALU of that particular die, as directed by dataset controller 230.

Dataset controller 230 is also capable of performing dataset operations, for example, add, subtract, multiply, divide, compare, shift, rotate, two's complement, multiply-accumulate (MAC), AND, OR, XOR, matrix multiplication, vector operations, and the like. In some embodiments, dataset controller 230 may be more capable in comparison with memory level ALU 150. For example, dataset controller 230 may be able to perform more complex operations, different operations, on larger amounts of data, and/or in a faster manner in comparison to memory level ALU 150. If a dataset operation requires nodes that are stored on different memory dice, such dataset operation(s) may be performed by dataset controller 230, in accordance with embodiments of the present invention. Dataset controller 230 may also perform dataset operations that are enhanced by the relatively greater computational capability of dataset controller 230.

In accordance with embodiments of the present invention, Dataset controller 230 may receive extended dataset operation commands from processor(s) 290.

Dataset controller 230 comprises dataset placement control function 240. Dataset placement control function 240 may comprise, for example, combinational logic, finite state machine(s), and/or stored program processing unit(s), in any combination, and may further include microcode. Dataset placement control function 240 places data received from processor(s) 290 into memory die array 210 into locations and into a data structure that is beneficial to processing a very large dataset, and facilitates operations by a memory level ALU. For example, dataset placement control function 240 will attempt place logically adjacent nodes and/or edges in physical proximity within a same memory integrated circuit, e.g., memory integrated circuit 100 (FIG. 1), in order to enable a memory level ALU, e.g., memory level ALU 150 (FIG. 1) of that memory integrated circuit to perform dataset operations. An exemplary dataset organization is presented below in FIG. 4.

Figure 4:
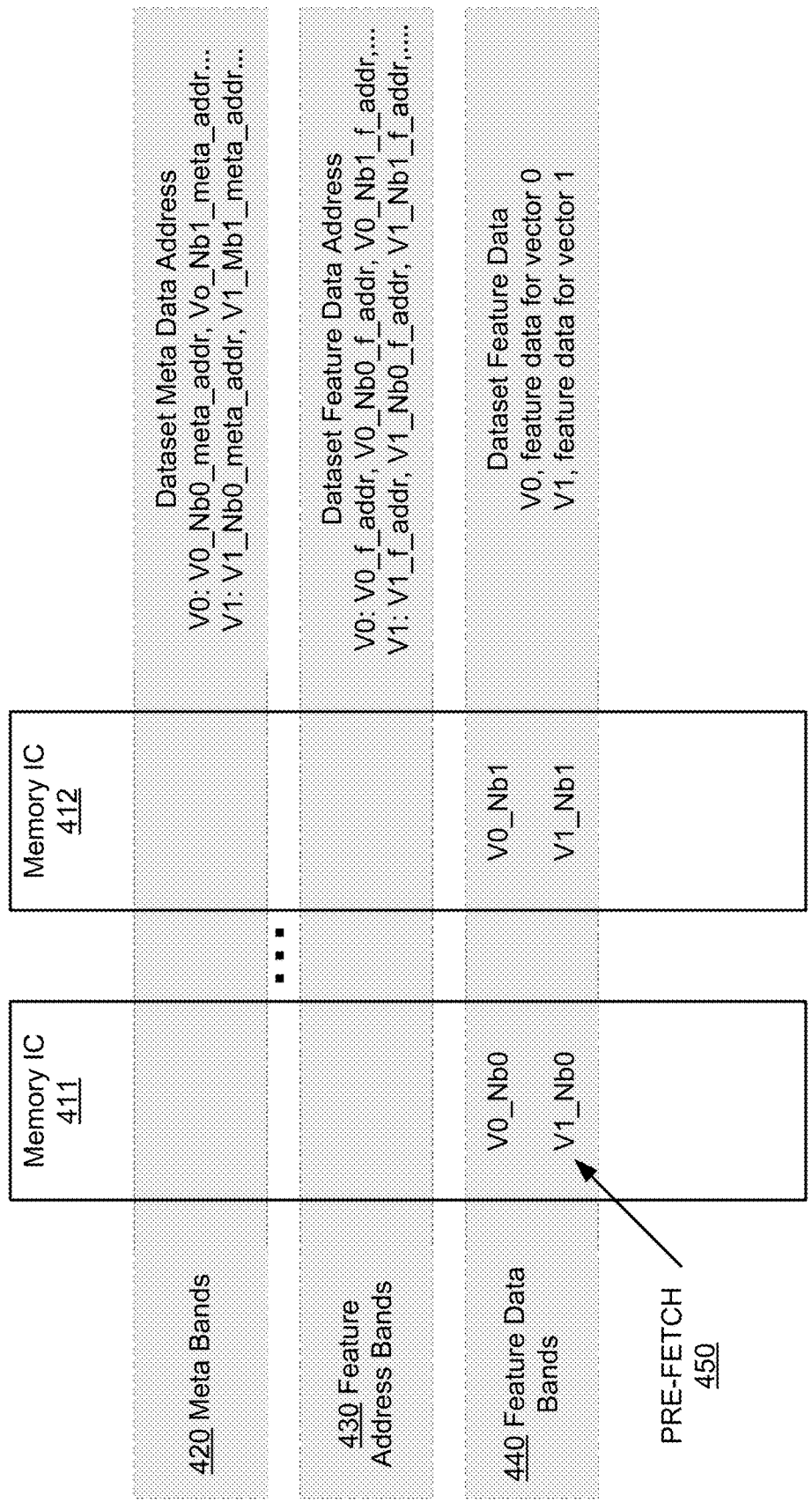
FIG. 4 illustrates an exemplary data set to facilitate processing very large datasets, in accordance with embodiments of the present invention.

Dataset controller 230 comprises dataset data fetch and prefetch control function 250. Data fetch and prefetch control function 250 may comprise, for example, combinational logic, finite state machine(s), and/or stored program processing unit(s), in any combination, and may further include microcode. Data fetch and prefetch control function 250 is operable to access data values of a dataset, for example, by accessing and following pointers and/or links to such data within a dataset. For example, in accordance with a FIG. 4 dataset organization embodiment, further described below, data fetch and prefetch control function 250 may access a vector meta address from meta bands 420 (FIG. 4), access an address of the vector feature data from feature address bands 430 (FIG. 4), and utilize the vector feature data address to find and/or access vector feature data stored in feature data bands 440 (FIG. 4).

Dataset controller 230 comprises dataset accelerator 270. Dataset accelerator 270 may comprise, for example, combinational logic, finite state machine(s), and/or stored program processing unit(s), in any combination, and may further include microcode. Dataset accelerator 270 is operable to perform a wide range of dataset operations, including, for example, arithmetic logic unit (ALU) type operations as previously described with respect to memory level arithmetic logic unit (ALU) 150 (FIG. 1). In some embodiments, dataset accelerator 270 may comprise additional functions useful for dataset processing, not found in a memory level arithmetic logic unit (ALU). Such additional functions may include, for example, matrix multiplication and/or a vector processing unit (VPU).

In general, dataset accelerator 270 performs dataset operations that are not well suited for a memory level arithmetic logic unit (ALU). For example, a memory level arithmetic logic unit (ALU), located in a first die, may not be well suited to perform operations requiring operands stored in a second die. In some embodiments, dataset accelerator 270 may be capable of operations that are beyond the capability of a memory level arithmetic logic unit (ALU). In some embodiments, dataset accelerator 270 may perform operations more efficiently, e.g., faster, than a memory level arithmetic logic unit (ALU).

Dataset controller 230 comprises offload dataset operations to memory die array function 260. Offload dataset operations to memory die array function 260 may comprise, for example, combinational logic, finite state machine(s), and/or stored program processing unit(s), in any combination, and may further include microcode. Offload dataset operations to memory die array function 260 is operable to determine if dataset operations, e.g., operations to accumulate a series of vector data values, may be performed by a memory integrated circuit ALU, for example, memory level arithmetic logic unit (ALU) 150 (FIG. 1). For example, offload dataset operations to memory die array function 260 determines if the operands of a dataset operation are located within a single memory integrated circuit, e.g., memory integrated circuit 100 (FIG. 1). If the operands are located within a single memory integrated circuit, the operation may be performed by a memory integrated circuit ALU. Generally, if the operands are not located within a single memory integrated circuit, the operation will not be performed by a memory integrated circuit ALU. In this case, the dataset operation may be performed by dataset accelerator 270.

Similarly, offload dataset operations to memory die array function 260 determines if a memory integrated circuit ALU is capable of performing the dataset operation. As previously presented, dataset accelerator 270 may be may be able to perform more complex operations, different operations, on larger amounts of data, and/or in a faster manner in comparison to a memory level ALU. In such a case, offload dataset operations to memory die array function 260 may direct dataset accelerator 270 to perform the dataset operations.

In accordance with embodiments of the present invention, offload dataset operations to memory die array function 260 may direct that portions of a dataset operation are performed by one or more memory integrated circuit ALU(s), while other portions of the dataset operation are performed by dataset accelerator 270. For example, memory integrated circuit ALUs on different memory integrated circuits may perform accumulate operations on data stored within the corresponding memory integrated circuits while dataset accelerator 270 access results from the memory integrated circuit ALUs to perform an accumulation on data stored across a plurality of memory integrated circuits.

FIG. 3 illustrates an exemplary instruction 300 that is sent to a memory integrated circuit, e.g., memory integrated circuit 100 of FIG. 1, in accordance with embodiments of the present invention. Instruction 300 comprises a novel superset of a conventional instruction that may be received by, for example, a conventional NAND type flash chip. For example, a conventional NAND type flash chip may receive an opcode instructing the chip to read or write a page, or to erase a block of memory. Similarly, a conventional NAND type flash chip may receive an address within the chip upon which to perform the operation specified by the opcode. There are typically several forms of address available, including plane, page, and/or block number, as well as offset addressing.

In accordance with embodiments of the present invention, instruction 300 is a novel instruction generated by a dataset controller, e.g., dataset controller 230 of FIG. 2. Instruction 300 is sent to a memory integrated circuit, e.g., memory integrated circuit 100 of FIG. 1. Instruction 300 comprises a dataset opcode 340. Dataset opcode 340 instructs a memory level arithmetic logic unit, e.g., ALU 150 (FIG. 1), to perform a dataset operation, for example, multiply the feature data of two vectors.

Instruction 300 comprises a prefetch address 330. The prefetch address may be generated by data fetch and prefetch control function 250 (FIG. 2) in some embodiments. A memory level arithmetic logic unit may use prefetch address 330 to determine some of the data to be operated on in accordance with dataset opcode 340. Instruction 300 comprises a flag 350 to indicate in a result of the dataset operation corresponding to opcode 340 is to be added to an accumulation register of a memory level arithmetic logic unit. Address 320 is a conventional address used to perform conventional operations of a memory integrated circuit. In some embodiments, base opcode field 310 is expanded to include a flag and/or new opcode to indicate that the instance of instruction 300 is not a conventional memory operation, and comprises dataset opcodes, e.g., a valid dataset opcode 340. In some embodiments, a set of dataset opcodes 340 includes a "no operation" code to indicate that the instance of instruction 300 is a conventional memory operation.

FIG. 4 illustrates an exemplary data set 400 to facilitate processing very large datasets, in accordance with embodiments of the present invention. Data set 400 comprises three bands 420 430, 440 of information across a plurality of memory integrated circuits 411, 412, e.g., memory die array 210 of FIG. 2. For example, each memory integrated circuit 411, 412, is characterized as having a similar organization comprising three types of data corresponding to the three bands. In general there will be many more memory integrated circuits than illustrated, for example, 100 or more memory integrated circuits.

Dataset 400 comprises feature data bands 440. Feature data bands 440 comprise a typically large amount of data corresponding to a dataset, e.g., each node of a graph. This data may often be expressed as an array or vector of data. This data may be known as the information content of a node. A data entry is typically a fixed length, although that is not required. Variable length feature data is enabled by embodiments in accordance with the present invention.

Dataset 400 comprises feature address bands 430. Feature address bands 430 comprises information on a dataset, e.g., a graph structure. Feature address bands 430 identifies the neighbor vectors of each vector. In some embodiments, address bands 430 is limited to address information of a dataset, e.g., a graph, in contrast to storing feature data of the dataset. For example, feature address bands 430 comprise pointers to data stored in feature data bands 440, further described below. As an example, if vector zero has two neighbors, feature address bands 430 comprise the address of vector zero's data—vector zero feature address "V0_f_addr"—and the feature data address(es) of vector zero's neighbors—vector zero neighbor zero feature address, "V0_Nb0_f_addr," and vector zero neighbor one feature address "V0_Nb1_f_addr," as shown on the right of feature address bands 430 in FIG. 4.

Similarly, the feature data addresses for neighbors of vector one are listed: vector one feature address "V1_f_addr," vector 1 neighbor zero feature data address "V1_Nb0_f-addr," and the like. The feature data addresses for all neighbors of all vectors are listed in the feature address bands 430. It is appreciated that some neighbors may be located in different memory integrated circuits, in some embodiments. In this novel manner, a plurality of relationships among a dataset, e.g., a graph structure, may be encoded.

Dataset 400 comprises meta bands 420. The meta bands 420 comprise address information of the feature address data corresponding to various nodes or vertices of a graph. For example, meta bands 420 comprise pointers to entries in feature address bands 430. The pointers of meta bands 420 are located at fixed and/or easily determined addresses within a memory integrated circuit, which may enable various processes to find feature data addresses from feature address bands 430, and access ultimately feature data within feature data bands 440. For example, to access feature data for vector zero, a process may look up vector zero's meta address from within meta bands 420. The meta address in meta bands 420 will point to an entry in feature address bands 430. Accessing that entry within feature address bands 420 will provide an address for vector zero's feature data, located in feature data bands 440.

In accordance with embodiments of the present invention, an entire large dataset is stored in a single drive unit, e.g., drive unit 200 of FIG. 2. For example, in a solid state drive embodiment, a drive unit may comprise 160 NAND-based memory integrated circuits to hold a dataset up to 16 terabytes in size. A drive page size may be advantageously set to correspond with the size of a node's feature data size. Neighbor nodes may be located in different memory integrated circuits in order to parallelize read operations from different memory integrated circuits. In accordance with embodiments of the present invention, a prefetch function is used to find the next neighbor nodes on a current memory integrated circuit, instead of loading a next page in sequence. Pre-fetch 450 of FIG. 4 illustrates the feature data to be prefetched. Prefetched data may be loaded into prefetch buffer 122 of FIG. 1, in some embodiments.

Figure 5:
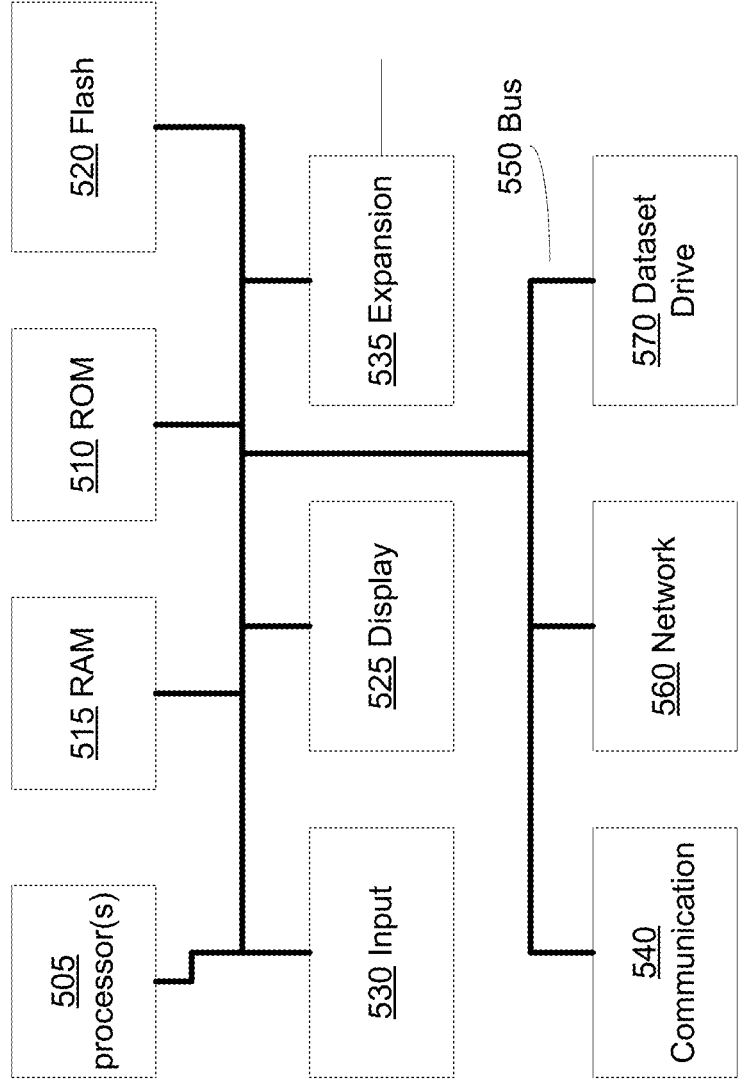
FIG. 5 illustrates an exemplary block diagram of an exemplary electronic system, which may be used as a platform to implement embodiments of the present invention.

FIG. 5 illustrates a block diagram of an exemplary electronic system 500, which may be used as a platform to implement embodiments of the present invention. Electronic system 500 may be a "server" computer system, in some embodiments. Electronic system 500 includes an address/data bus 550 for communicating information, a central processor complex 505 functionally coupled with the bus for processing information and instructions. Bus 550 may comprise, for example, a Peripheral Component Interconnect Express (PCIe) computer expansion bus, industry standard architecture (ISA), extended ISA (EISA), MicroChannel, Multibus, IEEE 796, IEEE 1196, IEEE 1496, PCI, Computer Automated Measurement and Control (CAMAC), MBus, Runway bus, Compute Express Link (CXL), and the like.

Central processor complex 505 may comprise a single processor or multiple processors, e.g., a multi-core processor, or multiple separate processors, in some embodiments. Central processor complex 505 may comprise various types of well known processors in any combination, including, for example, digital signal processors (DSP), graphics processors (GPU), complex instruction set (CISC) processors, reduced instruction set (RISC) processors, and/or very long word instruction set (VLIW) processors. Electronic system 500 may also includes a volatile memory 515 (e.g., random access memory RAM) coupled with the bus 550 for storing information and instructions for the central processor complex 505, and a non-volatile memory 510 (e.g., read only memory ROM) coupled with the bus 550 for storing static information and instructions for the processor complex 505. Electronic system 500 also optionally includes a changeable, non-volatile memory 520 (e.g., NOR flash) for storing information and instructions for the central processor complex 505 which can be updated after the manufacture of system 500. In some embodiments, only one of ROM 510 or Flash 520 may be present.

Also included in electronic system 500 of FIG. 5 is an optional input device 530. Device 530 can communicate information and command selections to the central processor 500. Input device 530 may be any suitable device for communicating information and/or commands to the electronic system 500. For example, input device 530 may take the form of a keyboard, buttons, a joystick, a track ball, an audio transducer, e.g., a microphone, a touch sensitive digitizer panel, eyeball scanner, and/or the like.

Electronic system 500 may comprise a display unit 525. Display unit 525 may comprise a liquid crystal display (LCD) device, cathode ray tube (CRT), field emission device (FED, also called flat panel CRT), light emitting diode (LED), plasma display device, electro-luminescent display, electronic paper, electronic ink (e-ink) or other display device suitable for creating graphic images and/or alphanumeric characters recognizable to the user. Display unit 525 may have an associated lighting device, in some embodiments.

Electronic system 500 also optionally includes an expansion interface 535 coupled with the bus 550. Expansion interface 535 can implement many well known standard expansion interfaces, including without limitation the Secure Digital Card interface, universal serial bus (USB) interface, Compact Flash, Personal Computer (PC) Card interface, CardBus, Peripheral Component Interconnect (PCI) interface, Peripheral Component Interconnect Express (PCI Express), mini-PCI interface, IEEE 5394, Small Computer System Interface (SCSI), Personal Computer Memory Card International Association (PCMCIA) interface, Industry Standard Architecture (ISA) interface, RS-232 interface, and/or the like. In some embodiments of the present invention, expansion interface 535 may comprise signals substantially compliant with the signals of bus 550.

A wide variety of well-known devices may be attached to electronic system 500 via the bus 550 and/or expansion interface 535. Examples of such devices include without limitation rotating magnetic memory devices, flash memory devices, digital cameras, wireless communication modules, digital audio players, and Global Positioning System (GPS) devices.

System 500 also optionally includes a communication port 540. Communication port 540 may be implemented as part of expansion interface 535. When implemented as a separate interface, communication port 540 may typically be used to exchange information with other devices via communication-oriented data transfer protocols. Examples of communication ports include without limitation RS-232 ports, universal asynchronous receiver transmitters (UARTs), USB ports, infrared light transceivers, ethernet ports, IEEE 5394, and synchronous ports.

System 500 optionally includes a network interface 560, which may implement a wired or wireless network interface. Electronic system 500 may comprise additional software and/or hardware features (not shown) in some embodiments.

Various modules of system 500 may access computer readable media, and the term is known or understood to include removable media, for example, Secure Digital ("SD") cards, CD and/or DVD ROMs, diskettes and the like, as well as non-removable or internal media, for example, hard drives, RAM, ROM, flash, and the like.

Electronic System 500 comprises one or more dataset drive(s) 570, functionally coupled to the processor complex 505. The dataset drive(s) 570 may be coupled to processor complex 505 via bus 550 in some embodiments. The dataset drive(s) 570 may be coupled to processor complex 505 via expansion interface 535 in some embodiments. In accordance with embodiments of the present invention, the dataset drive(s) 570, e.g., drive unit 200 as described with respect to FIG. 2, comprise features to perform a variety of operations on large datasets within the dataset drive 570 itself, e.g., without requiring a transfer of large amounts of data to processor complex 505.

Embodiments in accordance with the present invention provide systems and methods for processing large datasets. In addition, embodiments in accordance with the present invention provide systems and methods for processing large datasets that can overcome the bandwidth limitations of transferring a large dataset back and forth from main memory to a processor. Further, embodiments in accordance with the present invention provide systems and methods for processing large datasets that are compatible and complementary with existing systems and methods of processing large datasets, e.g., graph processing.

Various embodiments of the invention are thus described. While the present invention has been described in particular embodiments, it should be appreciated that the invention should not be construed as limited by such embodiments, but rather construed according to the below claims.

What is claimed is:

1. An apparatus comprising:
a bulk array of non-volatile memory cells on an integrated circuit die, wherein said bulk array comprises a plurality of planes, wherein each of said planes comprises a prefetch buffer and an output buffer; and
an arithmetic logic unit on said die coupled to said bulk array, wherein
said arithmetic logic unit is operable to perform arithmetic logic operations on contents of said bulk array responsive to instructions received from outside of said die.

2. The apparatus of claim 1 wherein said non-volatile memory cells comprise NAND-type flash memory cells.

3. The apparatus of claim 1 wherein said arithmetic logic unit is operable to perform said arithmetic logic operations independently of accessing data from outside of said integrated circuit die.

4. The apparatus of claim 1 wherein said arithmetic logic unit is configured to selectively couple to said prefetch buffer and said output buffer of each plane of said plurality of planes.

5. The apparatus of claim 4 wherein said arithmetic logic unit is configured to receive an instruction from outside of said integrated circuit die specifying a prefetch address and an opcode indicating an operation to be performed on data contained in said prefetch buffer and said output buffer of a given plane.

6. A drive controller comprising:
an interface configured to functionally couple said drive controller to a plurality of memory integrated circuit devices;
a bus interface configured to functionally couple said drive controller to a computer system
logic configured to selectively route a prefetch buffer and an output buffer from any place of said plurality of memory integrated-circuit devices to said drive controller; and
a dataset controller operable to perform dataset operations on a dataset stored within said plurality of memory integrated circuit devices without transferring contents of said dataset over said bus interface.

7. The drive controller of claim 6 wherein said dataset controller is further operable to create and maintain a dataset structure.

8. The drive controller of claim 6 wherein said dataset controller is further operable to fetch data of said dataset by following pointers of said dataset structure.

9. The drive controller of claim 6 wherein said dataset controller is further operable to perform dataset operations on data stored within said plurality of memory integrated circuit devices.

10. The drive controller of claim 6 wherein said dataset controller is further operable to distribute processing of said dataset operations to arithmetic logic units on said plurality of memory integrated circuit devices.

11. The drive controller of claim 6 wherein said dataset controller comprises a vector processing unit.

12. The drive controller of claim 6 further operable to receive, decode and perform dataset operations.

13. A solid state drive unit comprising:
- a plurality of non-volatile memory integrated circuit dice, wherein each said memory integrated circuit die comprises:
- a bulk array of non-volatile memory cells on an integrated circuit die, wherein said bulk array comprises a plurality of planes, wherein each of said planes comprises a prefetch buffer and an output buffer;
- an arithmetic logic unit on said die coupled to said bulk array, wherein
- said arithmetic logic unit is operable to perform arithmetic logic operations on contents of said bulk array responsive to instructions received from outside of said die;
- a bus interface configured to functionally couple said drive unit to a computer system; and
- a dataset controller operable to perform dataset operations on a dataset stored within said plurality of non-volatile memory integrated circuit dice without transferring contents of said dataset over said bus interface.

14. The solid state drive of claim 13 wherein said dataset controller is further operable to distribute processing of said dataset operations to said arithmetic logic units on said plurality of non-volatile memory integrated circuit dice.

15. The solid state drive of claim 13 wherein said dataset controller is further operable to create and maintain a dataset structure.

16. The solid state drive of claim 15 wherein said dataset controller is further operable to fetch data of said dataset by following pointers of said dataset structure.

17. The solid state drive of claim 13 wherein said dataset controller is further operable to perform operations on dataset elements located in different dice of said plurality of non-volatile memory integrated circuit dice.

18. The solid state drive of claim 13 wherein said dataset controller is further operable to perform a plurality of dataset operations more efficiently than said arithmetic logic unit.

19. The solid state drive of claim 18 wherein said plurality of dataset operations comprise matrix multiplication.

20. The solid state drive of claim 13 further comprising logic configured to selectively route said prefetch buffer and said output buffer from any plane of said bulk array to said arithmetic logic unit.

\* \* \* \* \*